United States Patent
Ma et al.

(10) Patent No.: US 11,805,492 B2
(45) Date of Patent: Oct. 31, 2023

(54) TIMING ADVANCE SLEW RATE CONTROL IN A NON-TERRESTRIAL NETWORK

(71) Applicant: QUALCOMM Incorporated, San Diego, CA (US)

(72) Inventors: Liangping Ma, San Diego, CA (US); Xiao Feng Wang, San Diego, CA (US); Peter Gaal, San Diego, CA (US); Changhwan Park, San Diego, CA (US); Jun Ma, San Diego, CA (US); Bharat Shrestha, San Diego, CA (US); Ayan Sengupta, San Diego, CA (US); Alberto Rico Alvarino, San Diego, CA (US); Umesh Phuyal, San Diego, CA (US); Huilin Xu, Temecula, CA (US); Harikumar Krishnamurthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 17/655,883

(22) Filed: Mar. 22, 2022

(65) Prior Publication Data
US 2023/0104479 A1    Apr. 6, 2023

Related U.S. Application Data

(60) Provisional application No. 63/262,015, filed on Oct. 1, 2021.

(51) Int. Cl.
*H04W 88/02* (2009.01)
*H04W 56/00* (2009.01)
*G01S 19/41* (2010.01)
*H04W 84/06* (2009.01)

(52) U.S. Cl.
CPC ......... *H04W 56/006* (2013.01); *G01S 19/41* (2013.01); *H04W 84/06* (2013.01)

(58) Field of Classification Search
CPC .............. H04B 7/18504; H04B 7/1851; H04B 7/18541; H04B 17/382; H04B 17/318; H04B 7/18513; H04L 5/008; H04L 5/0091; H04L 5/0048; H04L 27/2607; H04L 5/0023; H04L 27/26025; H04L 27/2613; H04W 72/0446; H04W 72/0453; H04W 74/0866; H04W 74/0833; H04W 74/0841; H04W 56/006; H04W 56/001; H04W 56/0045; H04W 74/006; H04W 84/06; H04W 36/14; H04W 36/08; H04W 76/27; H04W 80/02; H04W 72/27; H04W 56/0065

See application file for complete search history.

*Primary Examiner* — Jung Liu
(74) *Attorney, Agent, or Firm* — Harrity & Harrity, LLP

(57) ABSTRACT

Various aspects of the present disclosure generally relate to wireless communication. In some aspects, a user equipment (UE) may determine a differential UE-specific timing advance (TA) based at least in part on a difference between a first UE-specific TA associated with a current global navigation satellite system (GNSS) position fix and a second UE-specific TA associated with a previous GNSS position fix. The UE may transmit, to a non-terrestrial network (NTN) node, an uplink message at a time that is based at least in part on the differential UE-specific TA. Numerous other aspects are described.

30 Claims, 11 Drawing Sheets

TIMING ADVANCE SLEW RATE CONTROL IN A NON-TERRESTRIAL NETWORK

CROSS-REFERENCE TO RELATED APPLICATION

This Patent application claims priority to U.S. Provisional Patent Application No. 63/262,015, filed on Oct. 1, 2021, entitled "TIMING ADVANCE SLEW RATE CONTROL IN A NON-TERRESTRIAL NETWORK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for timing advance (TA) slew rate control in a non-terrestrial network (NTN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to determine a differential UE-specific timing advance (TA) based at least in part on a difference between a first UE-specific TA associated with a current global navigation satellite system (GNSS) position fix and a second UE-specific TA associated with a previous GNSS position fix. The one or more processors may be configured to transmit, to a non-terrestrial network (NTN) node, an uplink message at a time that is based at least in part on the differential UE-specific TA.

Some aspects described herein relate to a method of wireless communication performed by a UE. The method may include determining a differential UE-specific TA based at least in part on a difference between a first UE-specific TA associated with a current GNSS position fix and a second UE-specific TA associated with a previous GNSS position fix. The method may include transmitting, to an NTN node, an uplink message at a time that is based at least in part on the differential UE-specific TA.

Some aspects described herein relate to a non-transitory computer-readable medium that stores a set of instructions for wireless communication by a UE. The set of instructions, when executed by one or more processors of the UE, may cause the UE to determine a differential UE-specific TA based at least in part on a difference between a first UE-specific TA associated with a current GNSS position fix and a second UE-specific TA associated with a previous GNSS position fix. The set of instructions, when executed by one or more processors of the UE, may cause the UE to transmit, to an NTN node, an uplink message at a time that is based at least in part on the differential UE-specific TA.

Some aspects described herein relate to an apparatus for wireless communication. The apparatus may include means for determining a differential UE-specific TA based at least in part on a difference between a first UE-specific TA associated with a current GNSS position fix and a second UE-specific TA associated with a previous GNSS position fix. The apparatus may include means for transmitting, to an NTN node, an uplink message at a time that is based at least in part on the differential UE-specific TA.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
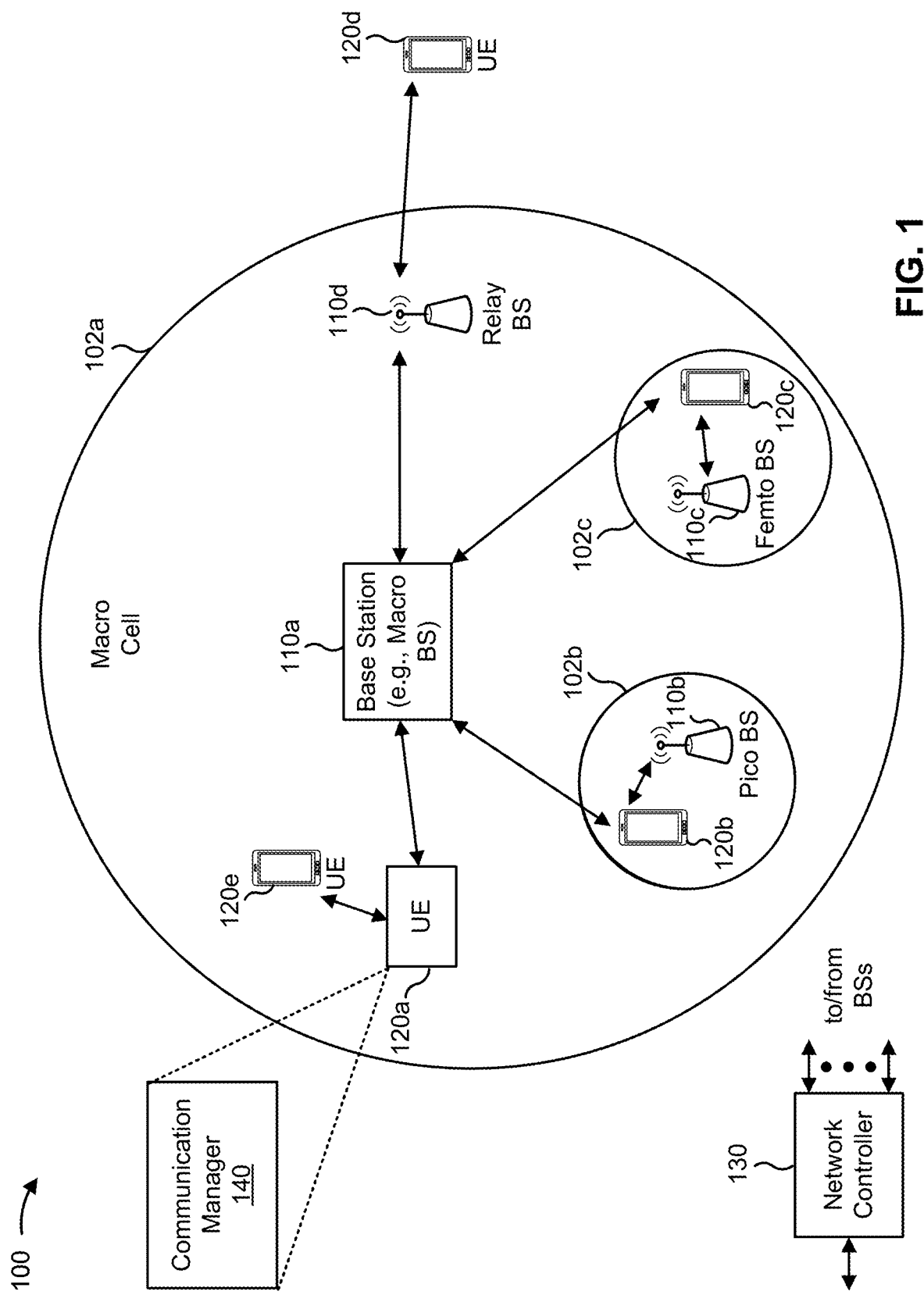
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some aspects, the UE 120 may include a communication manager 140. As described in more detail elsewhere herein, the communication manager 140 may determine a differential UE-specific timing advance (TA) based at least in part on a difference between a first UE-specific TA associated with a current global navigation satellite system (GNSS) position fix and a second UE-specific TA associated with a previous GNSS position fix; and transmit, to a non-terrestrial network (NTN) node, an uplink message at a time that is based at least in part on the differential UE-specific TA. Additionally, or alternatively, the communication manager 140 may perform one or more other operations described herein.

As indicated above, FIG. 1 is provided as an example. Other examples may differ from what is described with regard to FIG. 1.

Figure 2:
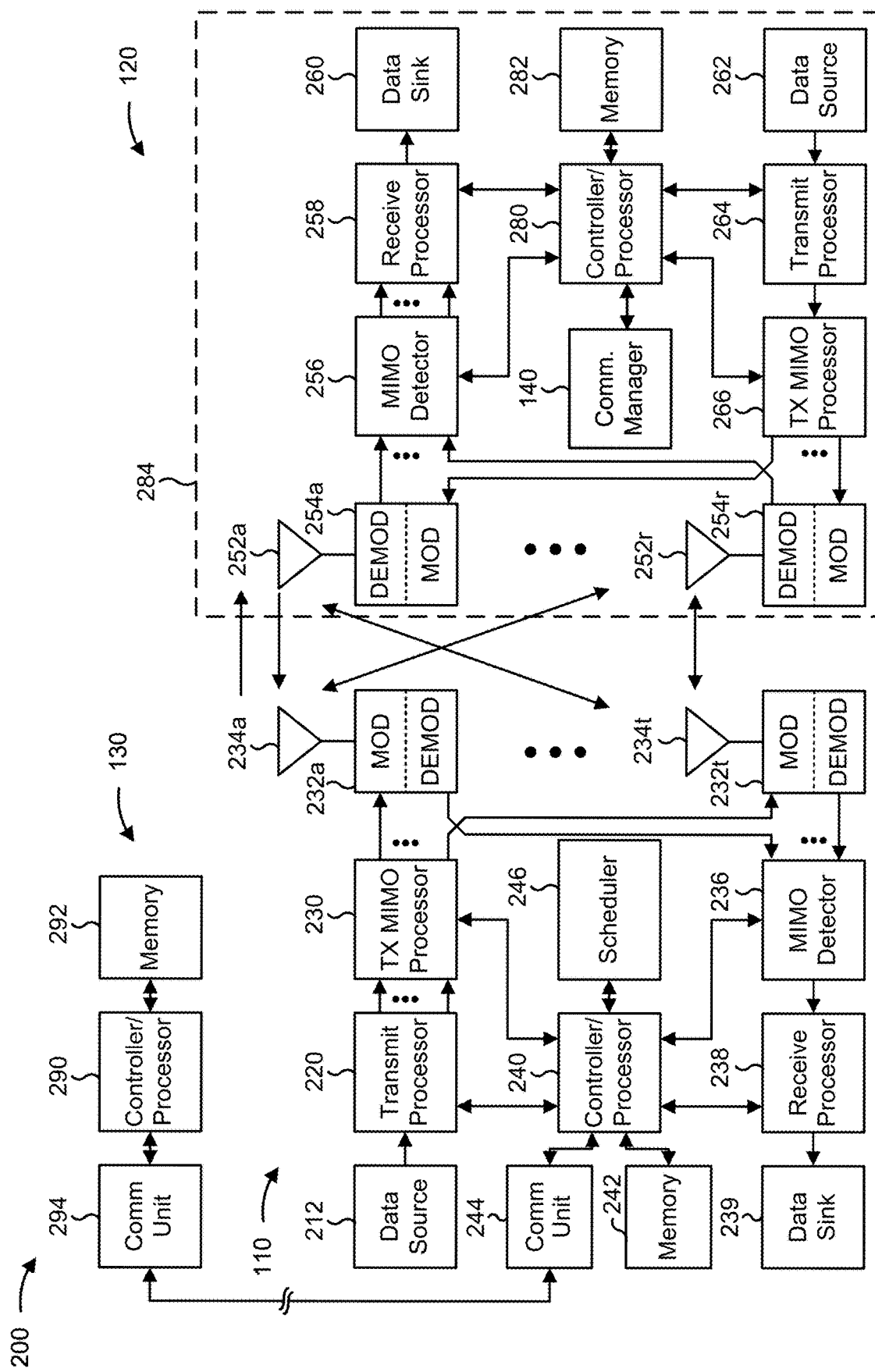
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with timing advance (TA) slew rate control in a non-terrestrial network (NTN), as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some examples, executing instructions may include running the instructions, converting the instructions, compiling the instructions, and/or interpreting the instructions, among other examples.

In some aspects, the UE 120 includes means for determining a differential UE-specific TA based at least in part on a difference between a first UE-specific TA associated with a current GNSS position fix and a second UE-specific TA associated with a previous GNSS position fix; and/or means for transmitting, to an NTN node, an uplink message at a time that is based at least in part on the differential UE-specific TA. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
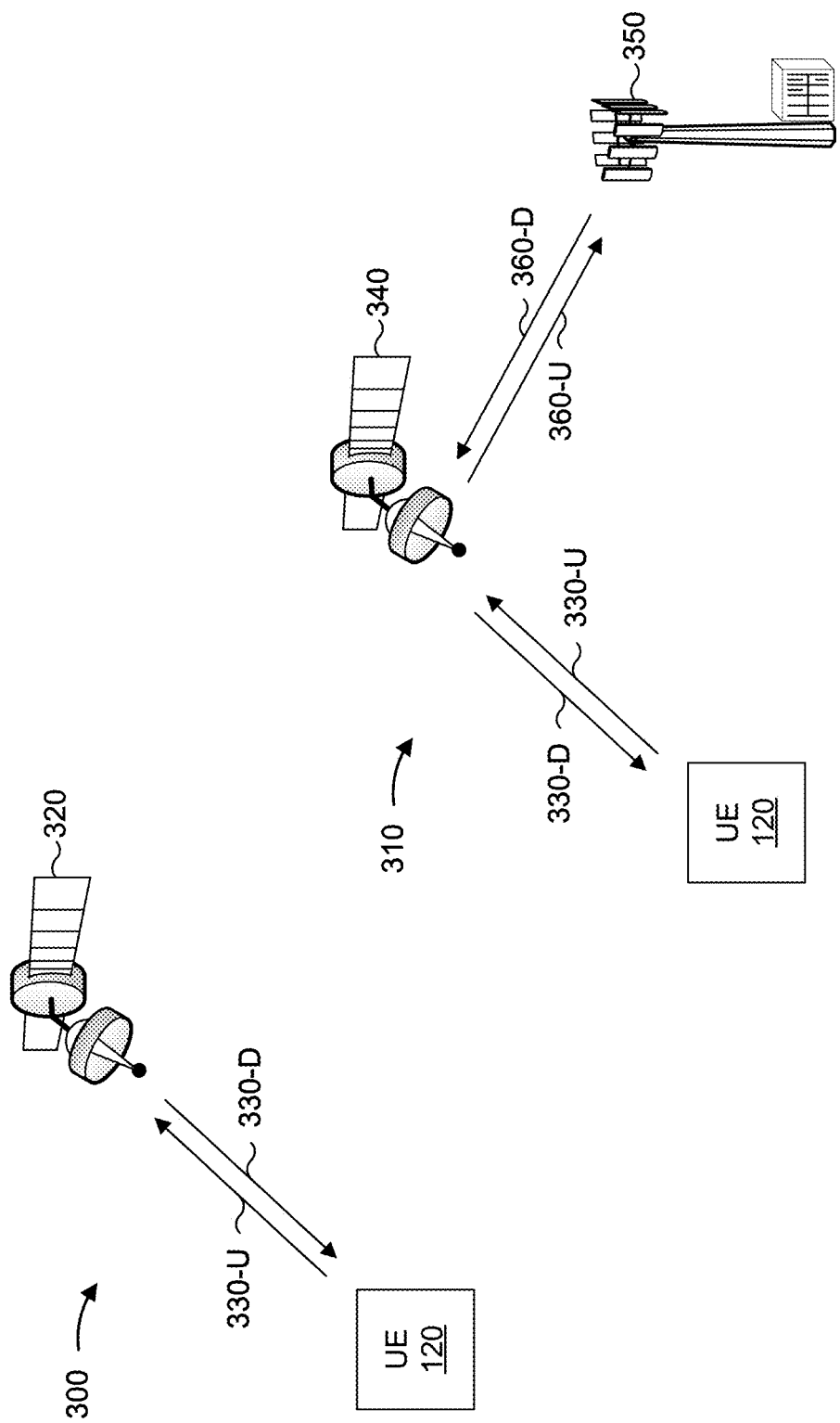
FIG. 3 is a diagram illustrating an example of a regenerative satellite deployment and an example of a transparent satellite deployment in a non-terrestrial network (NTN).

FIG. 3 is a diagram illustrating an example 300 of a regenerative satellite deployment and an example 310 of a transparent satellite deployment in an NTN.

Example 300 shows a regenerative satellite deployment in an NTN. In example 300, a UE 120 is served by a satellite 320 via a service link 330. For example, the satellite 320 may include a base station 110 (e.g., base station 110a) and/or a gNB. The satellite 320 may be referred to as a non-terrestrial base station, a regenerative repeater, and/or an on-board processing repeater, among other examples. The satellite 320 may demodulate an uplink radio frequency (RF) signal and may modulate a baseband signal derived from the uplink RF signal to produce a downlink RF transmission. The satellite 320 may transmit the downlink RF signal to the UE 120 on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from a gateway 350 via a feeder link 360. For example, the satellite 340 may receive an RF transmission from the gateway 350 via the feeder link 360 and may relay the RF transmission to the UE 120 via the service link 330 without demodulating the RF transmission. Additionally, or alternatively, the satellite 340 may receive an RF transmission from the UE 120 via the service link 330 and may relay the RF transmission to the gateway 350 via the feeder link 360 without demodulating the RF transmission. The satellite 340 may frequency convert the RF transmission(s) received on the service link 330 to a frequency of the RF transmission(s) on the feeder link 360 (or vice versa) and may amplify and/or filter the relayed RF transmission(s). The UEs 120 shown in example 300 and example 310 may be associated with a Global Navigation Satellite System (GNSS) capability or a Global Positioning System (GPS) capability, though not all UEs have such capabilities. The satellite 340 may provide a cell that covers the UE 120.

As shown in FIG. 3, the service link 330 may include a link between the satellite 320/340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120). As shown in FIG. 3, an uplink of the service link 330 is indicated by reference number 330-U and a downlink of the service link 330 is indicated by reference number 330-D. Similarly, an uplink of the feeder link 360 is indicated by reference number 360-U and a downlink of the feeder link 360 is indicated by reference number 360-D.

The feeder link 360 and the service link 330 may each experience Doppler effects due to the movement of the satellites 320 and 340, and potentially movement of a UE 120. The Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency. Furthermore, due to the long distance between the UE 120 and satellite 320/340, communication in an NTN may be associated with a much longer delay (e.g., a longer latency and/or a longer round-trip time (RTT)) than a delay associated with a terrestrial network. The delay may be even greater in a transparent satellite deployment because any communication between the UE 120 and the gateway 350 must travel over the service link 330 and the feeder link 360, each of which may associated with a longer delay than a terrestrial network.

As indicated above, FIG. 3 is provided as an example. Other examples may differ from what is described with regard to FIG. 3.

Figure 4:
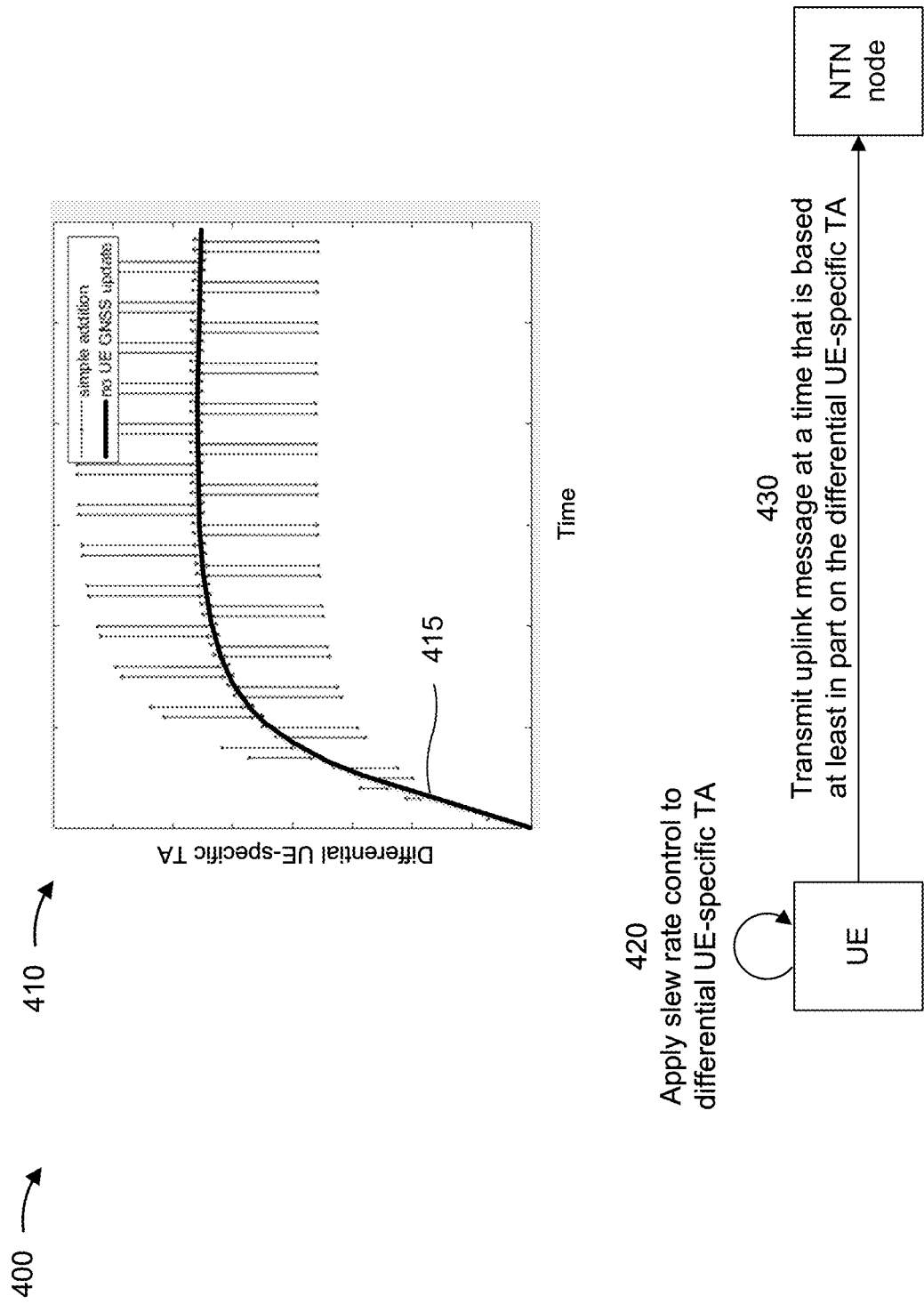
FIG. 4 is a diagram illustrating an example associated with timing advance (TA) slew rate control in an NTN, in accordance with the present disclosure.

FIG. 4 is a diagram illustrating an example 400 associated with TA slew rate control in an NTN, in accordance with the present disclosure. As shown in FIG. 4, example 400 includes communication between a UE (e.g., UE 120) and an NTN node (e.g., a regenerative satellite 320 that includes a base station 110 and/or a transparent satellite 340 that relays communications between the UE and a gateway 350, among other examples). In some aspects, the UE and the NTN node may be included in a wireless network, such as wireless network 100, which may be or include an NTN in which one or more satellites are deployed. In some aspects, the UE and the NTN node may communicate via a wireless service link, which may include an uplink (e.g., service link 330-U) and a downlink (e.g., service link 330-D).

In general, as described above, an NTN deployment may be associated with long delays (e.g., a long latency and/or a long RTT) relative to a terrestrial network due at least in part to the long distance between the UE and the NTN node. Furthermore, the delay in a transparent satellite deployment may exceed the delay in a regenerative satellite deployment because any communication between the UE and a base station or gateway travels from the UE to the NTN node over a service link and then from the NTN node to the base station or gateway over a feeder link, where both the service link and the feeder link may be associated with a longer delay than a terrestrial network. Accordingly, in an NTN, a UE may generally apply a timing advance (TA) to an uplink transmission performed in a radio resource control (RRC) idle or inactive state and/or an uplink transmission performed in an RRC connected state. For example, the TA applied by the UE may have a value that corresponds to a length of time that a signal takes to travel from the base station to the UE and back to the base station (which may be included in the NTN node in a regenerative satellite deployment or a gateway in a transparent satellite deployment). For example, the TA applied by the UE may correspond to a round-trip time (RTT) between the base station and the UE because the TA is relative to a downlink frame at the UE, which is already a single-trip delay relative to the same downlink frame at the base station. In this way, the TA applied by the UE may align uplink reception timing implemented at the base station to enable communication with different UEs that may be located at various distances from the base station. For example, the TA that a UE applies when performing an uplink transmission in an NTN, $T_{TA}$, may be given by:

$$T_{TA}=(N_{TA}+N_{TA,UE-specific}+N_{TA,common}+N_{TA,offset})\times T_c$$

In the above expression, $N_{TA}$ is a closed-loop timing offset between uplink and downlink radio frames at the UE. For example, the closed-loop timing offset may be defined as zero (0) for a physical random access channel (PRACH) transmission that occurs before the UE has established an RRC connection, and the closed-loop timing offset value may then be updated based at least in part on a TA command field in msg2 in a four-step random access procedure, a TA command field in msgB in a two-step random access procedure, and/or a medium access control (MAC) control element (MAC-CE) TA command, among other examples. Furthermore, the parameter $N_{TA,UE-specific}$ represents an open-loop UE-specific TA that is self-estimated by the UE to precompensate for a service link delay, the parameter $N_{TA,common}$ is a network-controlled common TA that includes any timing offsets that may be considered necessary by the NTN, the parameter $N_{TA,offset}$ is a fixed timing advance offset that the UE uses to calculate the TA applied to an uplink transmission, and $T_c$ is a timing unit defined as $1/(480,000\times4096)$ seconds, or 0.509 nanoseconds. In some cases, however, the open-loop UE-specific TA, $N_{TA,UE-specific}$, may potentially cause problems such as increased uplink reception timing error at the base station.

For example, the UE may self-estimate the open-loop UE-specific TA based at least in part on a position of the UE and a satellite position (e.g., a position of the NTN node), where the position of the UE may be estimated based at least in part on a current or most recent global navigation satellite system (GNSS) position fix, which the UE may update every few seconds (e.g., in 10 second intervals). Accordingly, during the interval between GNSS position fixes, the UE location that the UE uses to calculate the UE-specific TA may be inaccurate (e.g., when the UE is in motion). In some cases, the inaccuracy in the UE location used to calculate the UE-specific TA may be corrected in the closed-loop timing offset (e.g., the base station may measure the uplink reception timing error and transmit a TA command that indicates the closed-loop timing offset to be used to calculate the overall TA that the UE is to apply for an uplink transmission). As a result, when the UE calculates a new open-loop UE-specific TA following an updated GNSS position fix, the new open-loop UE-specific TA may correct for a change in the UE location even though the error in the UE location may have already been corrected by the closed-loop timing offset. This may cause a double correction problem, whereby the TA that the UE applies to an uplink transmission after updating a GNSS position fix is calculated based at least in part on the closed-loop timing offset and the open-loop UE-specific TA both correcting for an error in the UE location. For example, in FIG. 4, graph 410 illustrates how updated GNSS position fixes can result in abrupt changes in uplink timing (shown as spikes relative to curve 415, which represents the change to the UE-specific TA (e.g., in a time interval of 0.1 second) in a scenario where the UE does not update a GNSS position fix such that there is no double correction in the overall TA calculated by the UE).

The abrupt changes that occur when the UE obtains updated GNSS position fixes may lead to spikes or jumps in uplink reception timing error at a base station in NTN.

Accordingly, some aspects described herein relate to TA slew rate control that may be applied to mitigate spikes or jumps in uplink reception timing error at a base station in an NTN (e.g., to mitigate double correction that may occur when a UE calculates an updated UE-specific TA following an updated GNSS position fix). For example, as described herein, applying slew rate control to the open-loop UE-specific TA may be unsuitable because the open-loop UE-specific TA can change at a rate up to 50 microseconds per second (e.g., based at least in part on a satellite moving at a velocity around 7000 meters per second), which is too fast because wireless communication standards currently only support adjusting the UE-specific TA at a maximum rate of 0.895 microseconds per second for FR1 or a maximum rate of 0.407 microseconds per second for FR2. Accordingly, as shown by reference number 420, the UE may apply slew rate control to a differential UE-specific TA, which may be based at least in part on a difference between a first UE-specific TA calculated for a current GNSS position fix and a second UE-specific TA calculated for a previous GNSS position fix. For example, as described in further detail below with reference to FIG. 5, the UE may apply slew rate control by gradually adjusting the UE-specific TA after updating a GNSS position fix. Additionally, or alternatively, as described in further detail below with reference to FIG. 6, the UE may apply slew rate control by gradually adjusting the UE location that is used to calculate the UE-specific TA after the UE updates a GNSS position fix. Additionally, or alternatively, as described in further detail below with reference to FIGS. 7A-7C, the UE may avoid double correction in cases where a closed-loop TA command is received and one or more GNSS position fixes are updated between consecutive uplink transmissions by discounting the UE location error that has already been corrected by the closed-loop TA command. In this way, as shown by reference number 430, the UE may transmit an uplink message at a time that is based at least in part on the differential UE-specific TA with the slew rate control applied. For example, as described herein, the uplink message may be transmitted to the NTN node using a TA that is calculated based at least in part on an open-loop UE-specific TA that does not change abruptly when the UE updates a GNSS position fix, which may reduce errors in uplink reception timing at the base station.

As indicated above, FIG. 4 is provided as an example. Other examples may differ from what is described with regard to FIG. 4.

Figure 5:
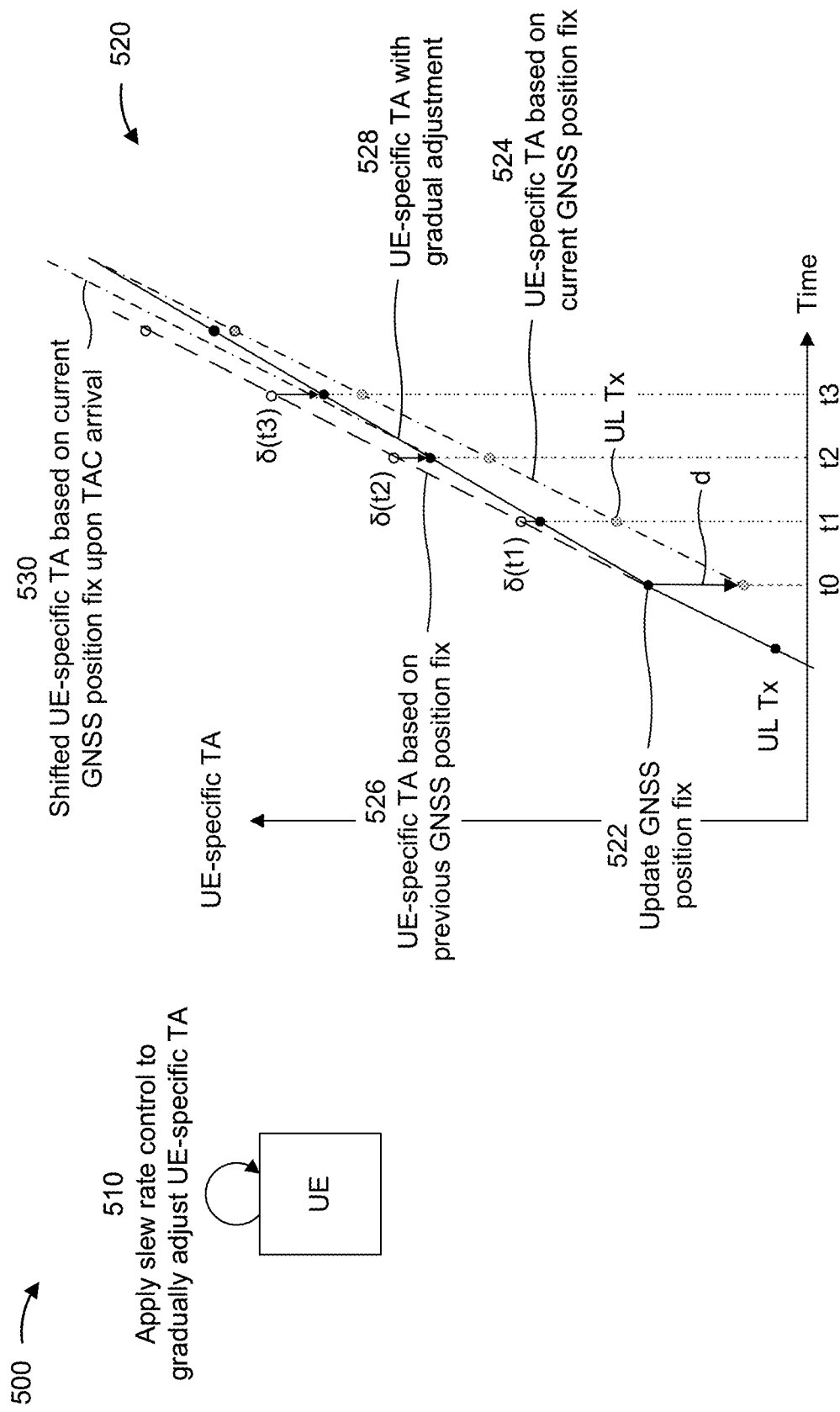
FIG. 5 is a diagram illustrating an example associated with controlling a TA slew rate in an NTN based at least in part on a gradual adjustment to a UE-specific TA, in accordance with the present disclosure.

FIG. 5 is a diagram illustrating an example 500 associated with controlling a TA slew rate in an NTN based at least in part on a gradual adjustment to a UE-specific TA, in accordance with the present disclosure. As shown in FIG. 5, example 500 includes a UE (e.g., UE 120) that may calculate a self-estimated open-loop UE-specific TA based at least in part on a position or location of the UE (referred to herein as a UE location) and a position or location of an NTN node (e.g., referred to herein as a satellite position). In some aspects, the UE may use the open-loop UE-specific TA to determine a TA to use when transmitting an uplink message to the NTN node (e.g., via a wireless service link).

As shown in FIG. 5, and by reference number 510, the UE may apply slew rate control to gradually adjust the UE-specific TA and thereby mitigate uplink reception timing errors that may occur at a base station in the NTN after the UE updates a GNSS position fix. For example, in some aspects, the UE may obtain a current GNSS position fix to update a previous GNSS position fix, and may apply the slew rate control to gradually adjust the UE-specific TA when a difference between a first UE-specific TA calculated for the current GNSS position fix and a second UE-specific TA calculated for the previous GNSS position fix exceeds a range±Te. In some aspects, the first UE-specific TA and the second UE-specific TA may be calculated based on the same satellite position, which may correspond to a satellite position at a time when the UE is to transmit an uplink message. Additionally, or alternatively, in some aspects, the first UE-specific TA and the second UE-specific TA may be calculated based on a satellite position and a satellite velocity that are the same as a satellite position and a satellite velocity at the time when the UE is to transmit the uplink message.

In some aspects, when the difference between the first UE-specific TA calculated for the current GNSS position fix and the second UE-specific TA calculated for the previous GNSS position fix exceeds the range±Te at the time of completing a new GNSS position fix, the UE may adjust the UE-specific TA used to calculate the overall TA such that the difference between the UE-specific TA used to calculate the overall TA and the UE-specific TAs calculated for the current GNSS position fix (e.g., for a time after completing the new GNSS position fix) is within the range±Te. For example, in some aspects, the UE may adjust the second UE-specific TA associated with the previous GNSS position fix by a delta, which may have a value that causes the adjusted UE-specific TA to differ from the first UE-specific TA associated with the current GNSS position fix by a value that is within the range±Te. Furthermore, to ensure that the gradual adjustment to the UE-specific TA is neither too fast nor too slow, a change in the delta that is used to adjust the UE-specific TA may satisfy one or more thresholds. For example, in some aspects, the delta may be adjusted over time, and each adjustment to the delta may satisfy a threshold, Tq seconds, that defines a maximum amount of a magnitude for the timing change in one adjustment. Additionally, or alternatively, multiple adjustments to the delta may result in an aggregate adjustment rate that satisfies a threshold that defines a minimum aggregate adjustment rate (e.g., Tp per a first time duration, such as Tp per second) and/or a threshold that defines a maximum aggregate adjustment rate (e.g., Tq per a second time duration, such as Tq per 200 milliseconds). In some aspects, the parameters Te, Tq, and Tp may have values that depend on one or more of a frequency range (e.g., FR1 or FR2), a subcarrier spacing (e.g., 15, 30, 60, or 120 kilohertz (kHz)), and/or a satellite orbit type (e.g., low earth orbit (LEO), geostationary equatorial orbit (GEO), and/or medium earth orbit (MEO), among other examples).

In some aspects, when the difference between the first UE-specific TA calculated for the current GNSS position fix and the UE-specific TA used to calculate the overall TA exceeds the range±Te at the time of completing a new GNSS position fix, the UE may adjust the UE-specific TA used to calculate the overall TA such that the difference between the UE-specific TA used to calculate the overall TA and the UE-specific TAs calculated for the current GNSS position fix (e.g., for a time after completing the new GNSS position fix) is within the range±Te. For example, in some aspects, the UE may adjust the UE-specific TA used to calculate the overall TA by a delta, which may have a value that causes the adjusted UE-specific TA to differ from the first UE-specific TA associated with the current GNSS position fix by a value that is within the range±Te. Furthermore, to ensure that the gradual adjustment to the UE-specific TA is neither too fast nor too slow, the delta that is used to adjust the UE-specific TA may satisfy one or more thresholds. For example, in some aspects, the delta satisfy a threshold, Tq seconds, that defines a maximum amount of a magnitude for the timing change in one adjustment. Additionally, or alternatively, multiple adjustments to the delta may result in an aggregate adjustment rate that satisfies a threshold that defines a minimum aggregate adjustment rate (e.g., Tp per a first time duration, such as Tp per second) and/or a threshold that defines a maximum aggregate adjustment rate (e.g., Tq per a second time duration, such as Tq per 200 milliseconds). In some aspects, the parameters Te, Tq, and Tp may have values that depend on one or more of a frequency range (e.g., FR1 or FR2), a subcarrier spacing (e.g., 15, 30, 60, or 120 kilohertz (kHz)), and/or a satellite orbit type (e.g., low earth orbit (LEO), geostationary equatorial orbit (GEO), and/or medium earth orbit (MEO), among other examples).

In some instance, in the connected mode, when the most recent GNSS fix, GNSS_f, differs from the GNSS used in previous open-loop TA calculation, GNSS_c, by more than x meters, i.e., |GNSS_f-GNSS_c|>x, UE is required to adjust the GNSS location used in open_loop TA calculation such that |GNSS_c_new-GNSS_f|GNSS_c-GNSS_f|. All adjustment made to GNSS location used in open-loop TA calculation shall satisfy the following conditions:
  The maximum distance of one GNSS location adjustment, |GNSS_c_new-GNSS_c_old|, shall be y
  the maximum aggregate adjustment and the minimum aggregate adjustment rate.

In some instances, in the connected mode, when the open-loop TA (e.g., UE-specific TA) differs from the RTD between UE and the connected satellite by more than x, i.e, |TA(GNSS_f, sat_current)−TA(GNSS_c, sat_current)|>x, where GNSS_f is the most recent GNSS fix, GNSS_c is the GNSS used in previous open-loop calculation, and sat_current is the current satellite location, UE is required to adjust the GNSS location used in open-loop TA calculation such that the open-loop TA is closer to RTD between UE and the connected satellite. The adjustment made to GNSS location used in open-loop TA calculation shall satisfy the following conditions:
  The maximum abount of open-loop TA change of one adjustment, i.e., |TA(GNSS_c_new, sat_current)−TA (GNSS_c, sat_current)|, shall be y
  The maximum aggregate adjustment and the minimum aggregate adjustment rate In some instances, in the connected mode, when UE-specific TA calculated without UE location update differs from the UE-specific TA calculated based on most recent GNSS fix by more than x1, i.e., |TA_ue(GNSS_f, sat_current)−TA_ue(GNSS_c, sat_current)|>x1, where GNSS_f is the most recent GNSS fix, GNSS_c is the GNSS location corresponding to the last applied UE specific TA, and sat_current is the current satellite location, UE is required to adjust the UE location when calculating the UE specific-TA such that the applied UE-specific TA is closer to the TA calculated using the most recent GNSS fix than using GNSS_c. The adjustment made to UE-specific TA due to UE location adjustments shall satisfy the following conditions:
  the maximum amount of UE specific TA change of one adjustment due to UE location update shall be y, i.e, |TA_ue_applied−TA_ue(GNSS_c, sat_current)|<x2.
  the maximum aggregate adjustment rate shall be x3 per T1 second.
  the minimum aggregate adjustment rate shall be x4 per T2 second.

In some aspects, reference number 520 depicts an example scenario in which the UE may apply slew rate control to gradually adjust the UE-specific TA following an updated GNSS position fix. For example, as shown in FIG. 5, the horizontal axis represents time and the vertical axis represents the UE-specific TA, which is generally based at least in part on the UE location and the satellite position. In general, the example shown in FIG. 5 illustrates an increase in the UE-specific TA, which may occur as the distance between the UE and the satellite increases. As shown by reference number 522, the UE may update a GNSS position fix at time t0. In some aspects, the UE may then calculate a first UE-specific TA based at least in part on the updated (current) GNSS position fix and may calculate a second UE-specific TA based at least in part on a GNSS position fix preceding the updated GNSS position fix, where the first UE-specific TA and the second UE-specific TA are both calculated based on the same satellite position or based on the same satellite position and velocity.

Accordingly, in this case, curve 524 represents the first UE-specific TA that is calculated based at least in part on the current GNSS position fix and curve 526 represents the second UE-specific TA that is calculated based at least in part on the previous GNSS position fix. As shown in FIG. 5, at time t0, the difference (d) between the first UE-specific TA and the second UE-specific TA may exceed the range±Te, whereby the UE may apply slew rate control to gradually adjust the UE-specific TA. For example, the UE may adjust the second UE-specific TA, which is based at least in part on the previous GNSS position fix and the current satellite position (e.g., current satellite and Earth motion), whereby the UE may cumulatively adjust, over time, the second UE-specific position fix that is based at least in part on the previous GNSS position fix by a delta, $\delta(tn)$ (e.g., at times when uplink transmissions are performed). In this way, as shown by curve 528, the UE may gradually move away from the curve 526 that represents the UE-specific TA that is calculated based at least in part on the previous GNSS position fix and toward the curve 524 that represents the UE-specific TA that is calculated based at least in part on the current GNSS position fix. For example, the delta, $\delta(tn)$, is a function of a delay, tn, after the most recent GNSS position fix (e.g., $\delta(tn)=f*maxSlewRate*tn*sign(d)$, where f represents an aggressiveness factor (with smaller values resulting in a slower adjustment and smaller timing error), maxSlewRate is a maximum slew rate for the UE-specific TA, tn is a time of the nth uplink transmission relative to the most recent GNSS position fix, and sign(d) is a sign of the difference between the UE-specific TA that is based at least in part on the current GNSS position fix and the UE-specific TA that is based at least in part on the previous GNSS position fix. In this way, applying slew rate control to gradually adjust the UE-specific TA may avoid abrupt changes in the UE-specific TA that may cause uplink reception timing errors at the base station and/or may remove the effect of satellite motion and Earth rotation in the slew rate control applied to the UE-specific TA by considering only the effect of the updated GNSS position fix. In some aspects, in cases where the UE receives a timing advance command (TAC) from the base station while performing the gradual adjustment to the UE-specific TA, the UE may stop the gradual adjustment. Additionally, the UE may shift (e.g., up or down without changing the slope) the UE-specific TA that is based at least in part on the current GNSS position fix 524 to the UE-specific TA that would be used for an uplink transmission at the TAC arrival, and the shifted UE-specific TA 530 may be used as the UE-specific TA for uplink transmissions after the TAC arrival (e.g., in place of the UE-specific TA with the gradual adjustment).

As indicated above, FIG. 5 is provided as an example. Other examples may differ from what is described with regard to FIG. 5.

Figure 6:
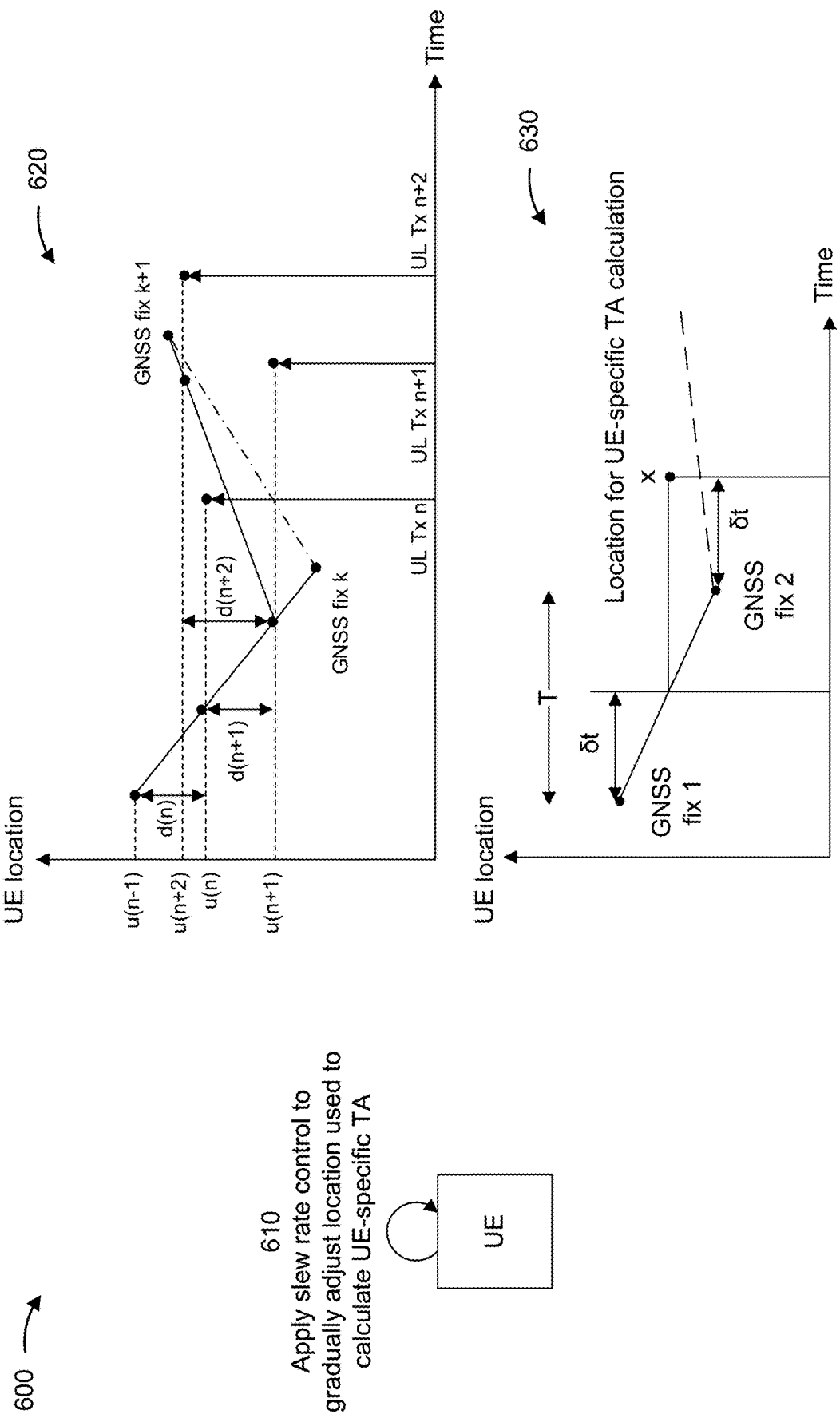
FIG. 6 is a diagram illustrating an example associated with controlling a TA slew rate in an NTN based at least in part on a gradual adjustment to a UE location used to calculate a UE-specific TA, in accordance with the present disclosure.

FIG. 6 is a diagram illustrating an example associated with controlling a TA slew rate in an NTN based at least in part on a gradual adjustment to a UE location used to calculate a UE-specific TA, in accordance with the present disclosure. As shown in FIG. 6, example 600 includes a UE (e.g., UE 120) that may calculate a self-estimated open-loop UE-specific TA based at least in part on a position or location of the UE (referred to herein as a UE location) and a position or location of an NTN node (e.g., referred to herein as a satellite position). In some aspects, the UE may use the open-loop UE-specific TA to determine a TA to use when transmitting an uplink message to the NTN node (e.g., via a wireless service link).

As shown in FIG. 6, and by reference number 610, the UE may apply slew rate control to gradually adjust the location used to calculate the UE-specific TA and thereby mitigate uplink reception timing errors that may occur at a base station in the NTN after the UE updates a GNSS position fix. For example, in some aspects, the UE may obtain a current GNSS position fix to update a previous GNSS position fix, and may apply the slew rate control to gradually adjust the location used to calculate UE-specific TA when a difference between a first UE-specific TA calculated for the current GNSS position fix and a second UE-specific TA calculated for the previous GNSS position fix exceeds a threshold, Te. In some aspects, the first UE-specific TA and the second UE-specific TA may be calculated based at least in part on the same satellite position, which may correspond to a satellite position at a time when the UE is to transmit an uplink message (e.g., at or after the time of the current GNSS position fix).

In some aspects, when the change in UE location from the previous GNSS position fix to the current GNSS position fix causes the difference between the first UE-specific TA calculated for the current GNSS position fix and the second UE-specific TA calculated for the previous GNSS position fix to exceed a threshold, Te, the UE may gradually adjust the location used to calculate the UE-specific TA. For example, starting from the previous GNSS position fix, the UE may gradually adjust the UE-specific TA associated with the previous GNSS position fix by a delta that satisfies one or more thresholds. For example, in some aspects, each adjustment to the UE location used to calculate the UE-specific TA may cause the UE-specific TA to change by a value that satisfies a threshold, Tq, that defines a maximum amount of a magnitude for the timing change in one adjustment (e.g., the change between the UE-specific TA used for a first uplink transmission and the UE-specific TA used for a next uplink transmission does not exceed the maximum amount of the magnitude of the change to the UE-specific TA in one adjustment). Additionally, or alternatively, each adjustment to the UE location may result in an aggregate change to the UE-specific TA that satisfies a threshold that defines a minimum aggregate adjustment rate (e.g., the aggregate change is not lower than the minimum rate, Tp per a first time duration, such as Tp per x milliseconds) and/or a threshold that defines a maximum aggregate adjustment rate (e.g., the aggregate change does not exceed the maximum rate, Tq per a second time duration, such as Tq per y milliseconds). In some aspects, the parameters Te, Tq, and Tp may have values that depend on one or more of a frequency range (e.g., FR1 or FR2), a subcarrier spacing (e.g., 15, 30, 60, or 120 kHz), and/or a satellite orbit type (e.g., LEO, GEO, and/or MEO, among other examples). In some aspects, the UE location used to calculate the current UE-specific TA may be a location between the UE location used to calculate the previous UE-specific TA and the current GNSS position fix (e.g., as shown by graph 620 in FIG. 6). Alternatively, in some aspects, the UE location used to calculate the current UE-specific TA may be a location between the previous GNSS position fix and the current GNSS position fix (e.g., as shown by graph 630 in FIG. 6).

Additionally, or alternatively, when the UE calculates the UE-specific TA for transmitting an uplink message, the UE may adjust the UE location used in the calculation such that a distance between the UE location used to calculate the UE-specific TA for a first uplink transmission and the UE location used to calculate the UE-specific TA for a next uplink transmission satisfies a threshold (e.g., does not exceed Dq meters), an aggregate distance change (e.g., over more than two uplink transmissions) satisfies a threshold defining a minimum adjustment rate (e.g., is at least Dp meters per x milliseconds), and/or the aggregate distance change satisfies a threshold defining a maximum adjustment rate (e.g., does not exceed Dq meters per y milliseconds). For example, as shown in FIG. 6, graph 620 depicts an example where d(n) represents the distance between the UE location used to calculate the UE-specific TA for uplink transmission n−1 and the UE location used to calculate the UE-specific TA for uplink transmission n, where the UE obtains an updated GNSS position fix k between uplink transmission n−1 and uplink transmission n. Accordingly, in the illustrated example, d(n) is subject to change rate control (e.g., slew rate control), where u(m) is the UE location used to calculate the UE-specific TA for uplink transmission m. For example, as shown in graph 620, a given d(n) may represent the distance between the UE location used to calculate the UE-specific TA for uplink transmission n−1 and uplink transmission n, and the UE may identify a UE location, u(n), on a line between the UE location used to calculate the UE-specific TA for uplink transmission n−1 and the UE location determined from the most recent GNSS position fix. Accordingly, the UE may use the identified UE location, u(n), to determine the UE location to use to calculate the UE-specific TA for uplink transmission n.

Additionally, or alternatively, when the UE calculates the UE-specific TA for performing an uplink transmission, the UE may adjust the UE location used in the calculation such that the UE location is interpolated or predicted based at least in part on a time difference between the uplink transmission and/or the GNSS position fixes. For example, in some aspects, the GNSS position fixes may provide a UE location and/or a UE velocity, where the UE location may be coordinates in a Cartesian coordinate system or GNSS coordinates (e.g., latitude angle, longitude angle, and/or altitude). For example, as shown in FIG. 6, and by graph 630, the UE may gradually adjust the UE location used to calculate the UE-specific TA for a current uplink transmission based at least in part on a current (most recent) GNSS position fix and one or more previous GNSS position fixes (prior to the most recent GNSS position fix) in order to avoid exceeding a maximum slew rate. In one example, the UE may determine a UE location, x, to use to calculate a UE-specific TA based at least in part on a current GNSS position fix, x2, and a previous GNSS position fix, x1, as follows:

$$x=(1-w)*x1+w*x2$$

where w is a weighting factor given by δt/T and T is a periodicity at which the UE obtains updated GNSS position fixes. In this example, when the UE determines the UE location to calculate the UE-specific TA following a next GNSS position fix, the UE may use only the UE location x2 corresponding to the preceding GNSS position fix. Alternatively, in some aspects, the UE may predict the UE location to use to calculate the UE-specific TA based at least in part on previous GNSS position fixes, as follows:

$$x=x2+(x2-x1)*w$$

As indicated above, FIG. 6 is provided as an example. Other examples may differ from what is described with regard to FIG. 6.

Figure 7A:
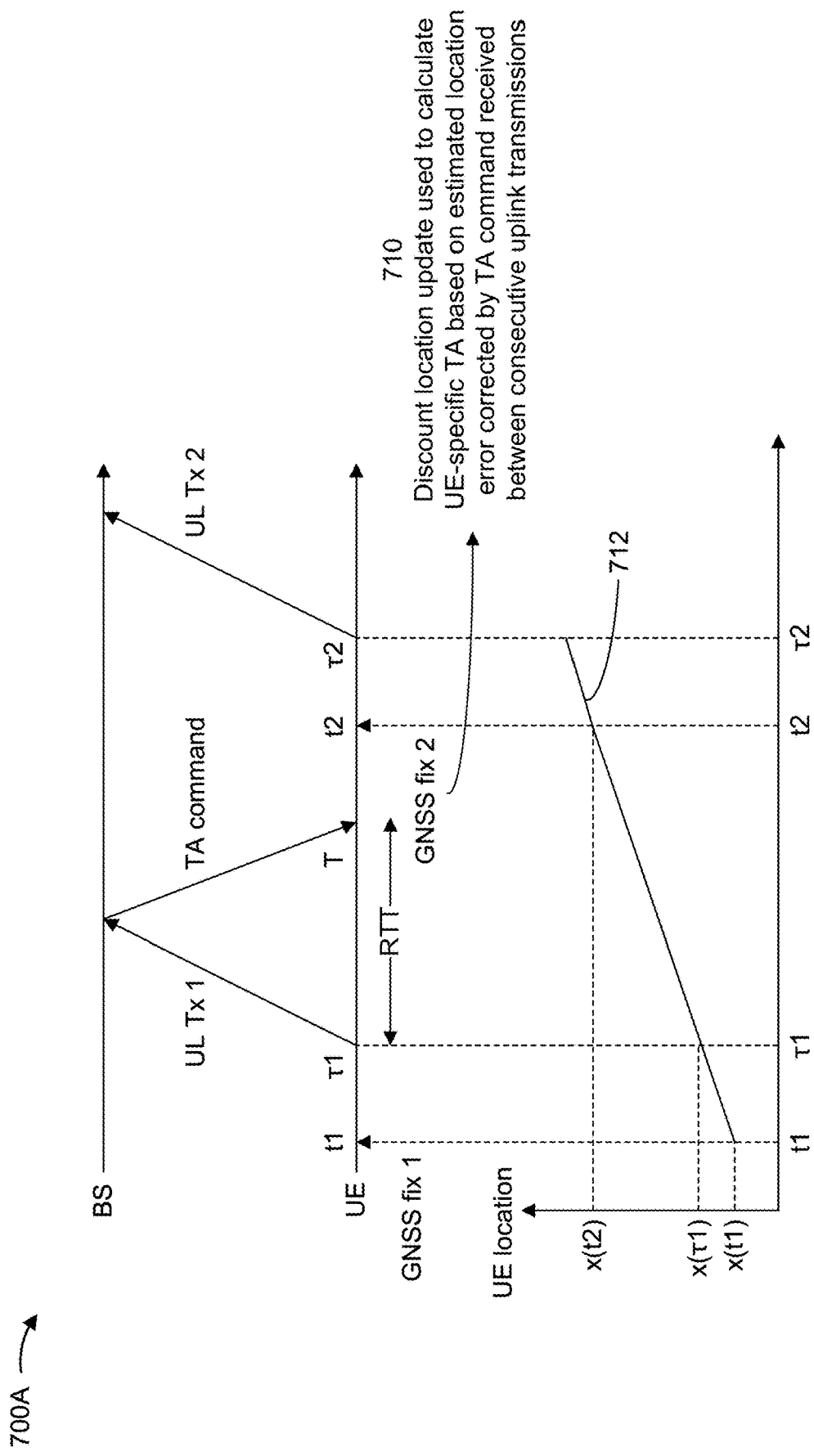
FIGS. 7A-7C are diagrams illustrating examples associated with controlling a TA slew rate in an NTN by discounting a UE location error corrected by a TA command, in accordance with the present disclosure.
Figure 7B:
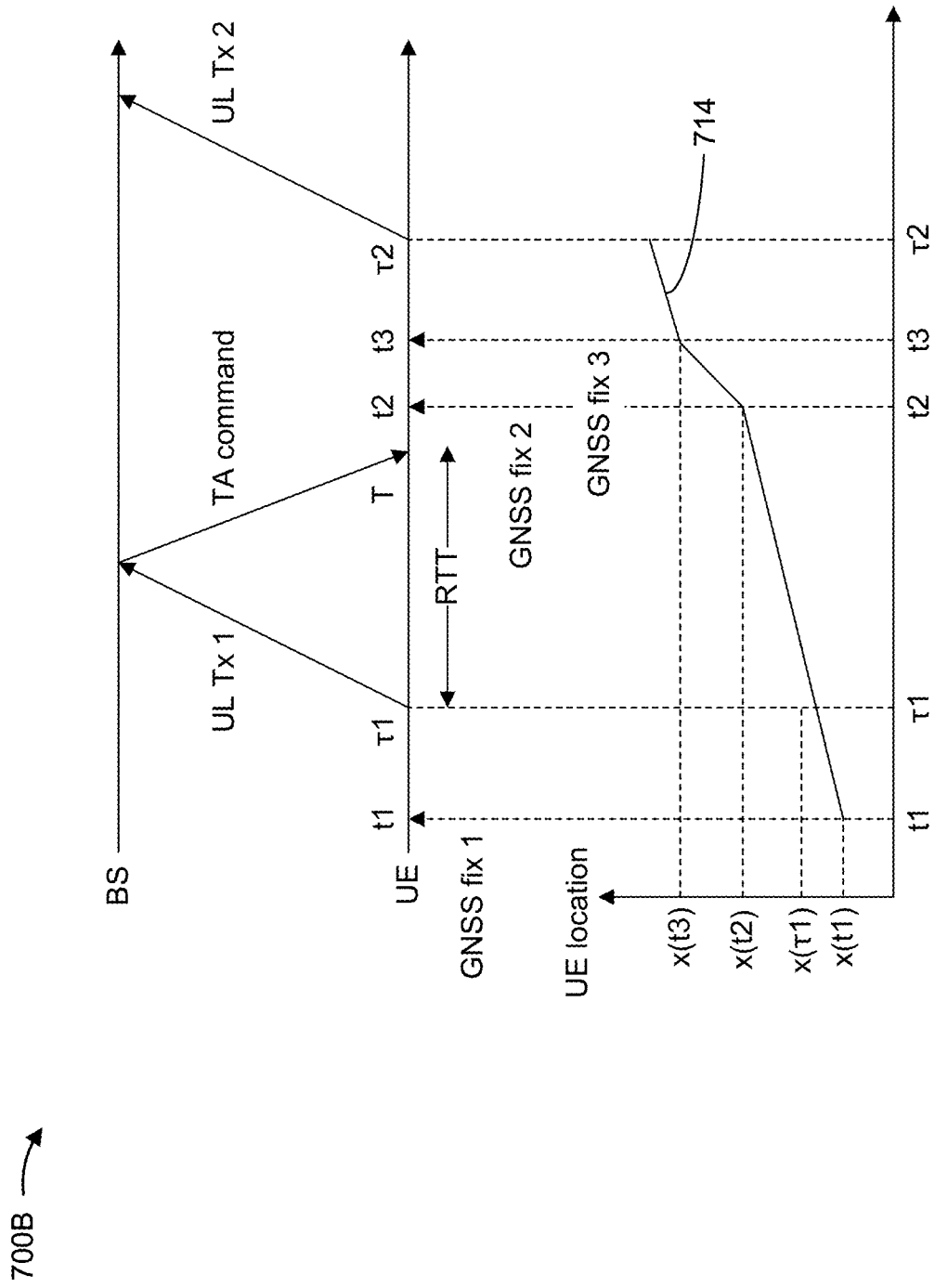
Figure 7C:
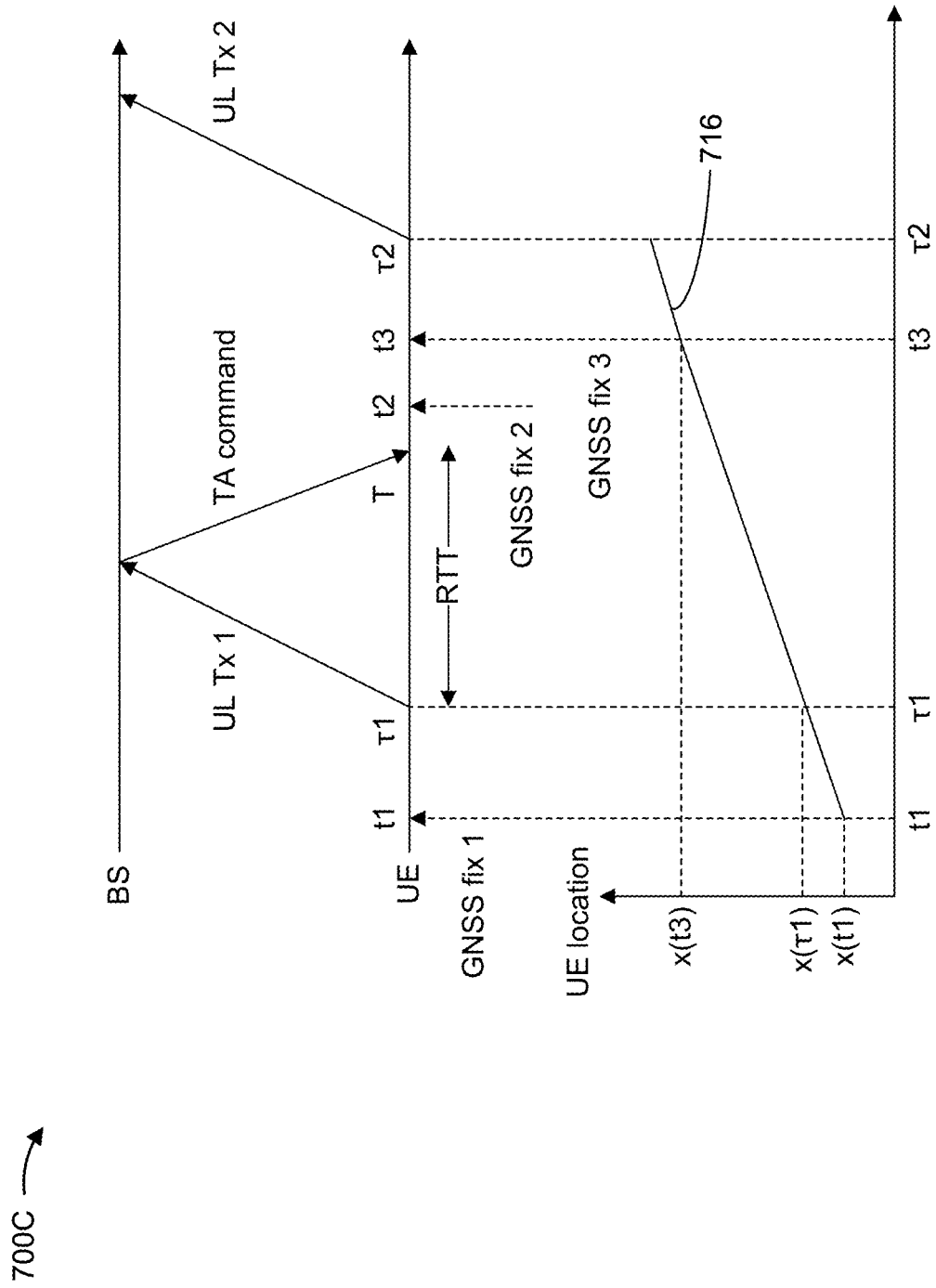

At the time ta when a UE finishes a GNSS fix n, if the difference between the UE-specific TA calculated based on the most recent GNSS fix TA(UE_GNSS(n), sat_position(ta)) and the UE-specific TA that would be used if there were an uplink transmission at time ta TA_old(ta), exceeds a threshold x, i.e., |TA(UE_GNSS(n), sat_position(ta))−TA_old(ta)|>x, then the UE forms a UE-specific TA_new(t) used for uplink transmissions for times after time ta based at least on TA(UE_GNSS(n), sat_position(t) and TA_old(t), until at some point of time tb such that |TA_new(tb)−TA(UE_GNSS(n), sat_position(tb))|<x or until the point of time of a next GNSS fix n+1 while ensuring that the adjustments to δ(t)=|TA_new(t)−TA_old(t)| for t>ta, at either of which points of time TA_old(t) is replaced by TA_new(t), meet the following requirements:

The maximum amount of one adjustment is y
The minimum amount of aggregate adjustment rate is z per 1 second
The maximum amount of aggregate adjustment rate is u per 1 second FIGS. 7A-7C are diagrams illustrating examples 700A, 700B, 700C associated with controlling a TA slew rate in an NTN by discounting a UE location error corrected by a TA command, in accordance with the present disclosure. As shown in FIGS. 7A-7C, examples 700A, 700B, 700C include a UE (e.g., UE 120) that may communicate with a base station (e.g., base station 110) in an NTN. For example, in a transparent satellite deployment, the UE may communicate with a satellite over a service link, and the satellite may communicate with the base station over a feeder link (e.g., communications between the UE and the base station may be relayed through the satellite). Alternatively, in a regenerative satellite deployment, the satellite may include the base station, and the UE may communicate with the base station over a service link.

As shown in FIG. 7A, and by reference number 710, the UE may calculate a self-estimated open-loop UE-specific TA by discounting a UE location update used to calculate a UE-specific TA in certain circumstances. For example, in scenarios where the UE receives a TA command that indicates or updates a closed-loop timing offset, the TA command may generally correct for an estimated error in the UE location. Accordingly, in cases where the UE receives a TA command and performs one or more GNSS position fixes between two consecutive uplink transmissions, the UE may discount the UE location update used to calculate the UE-specific TA according to an estimate of the UE location error corrected by the TA command (e.g., to avoid or mitigate double correction in the TA that the UE applies to the second of the two consecutive uplink transmissions). For example, in some aspects, the UE location update may be based at least in part on the GNSS position fix prior to the second of the two consecutive uplink transmissions (e.g., the most recent GNSS position fix) and the GNSS position fix prior to the first of the two consecutive uplink transmissions. Additionally, or alternatively, the UE location update may be based at least in part on the time of the second of the two consecutive uplink transmissions.

Furthermore, in some aspects, the UE may discount the UE location update used to calculate the UE-specific TA by the estimated UE location error corrected by the TA command only in cases where the first uplink transmission occurs at the time of arrival for the TA command minus a delay (e.g., to ensure that the TA command is correcting for a UE location error based at least in part on the first uplink transmission rather than another uplink transmission that occurred before the first uplink transmission). For example, in some aspects, the delay may be defined as a round-trip time (RTT) between the UE and the base station (e.g., the sum of the TA applied by the UE and $K_{mac}$, where $K_{mac}$ is an RTT between the base station and the satellite in a transparent deployment). Alternatively, in some aspects, the delay may be defined as the RTT between the UE and the base station plus an additional duration (e.g., a TA command MAC-CE application time), or the delay may be set to zero (0).

For example, in example 700A shown in FIG. 7A, the UE may obtain a first GNSS position fix at time t1 and may perform a first uplink transmission at time τ1. In the illustrated example 700A, the UE further performs a second uplink transmission at time τ2, whereby the first uplink transmission at time τ1 and the second uplink transmission at time τ2 are consecutive uplink transmissions. In this case, the UE receives a TA command from the base station and performs an updated GNSS position fix between the first uplink transmission and the second uplink transmission, and the first uplink transmission occurs at the time of arrival for the TA command, T, minus the RTT between the UE and the base station, whereby the UE location update used to calculate the UE-specific TA for the second uplink transmission may discount an estimate of the UE location error corrected by the TA command. In particular, the TA command received at time T corrects for the UE location error at time τ1, x(τ1)–x(t1), and the UE may discount the UE location update used to calculate the UE-specific TA for the second uplink transmission performed at time τ2 such that the UE-specific TA for the second uplink transmission only considers the remaining error x(t2)–x(τ1). For example, in cases where the UE does not predict the UE location at time τ2 (e.g., relying only on the GNSS position fix at time t2), the UE location used to calculate the UE-specific TA used in the TA applied at time τ2 may be determined as follows:

$$x(\tau 2) = x(t1) + \frac{(x(t2) - x(t1)) * (t2 - \tau 1)}{t2 - t1}$$

where T is a difference between the arrival time of the TA command, T, and the RTT between the UE and the base station. Alternatively, when the UE predicts the UE location at time τ2, as shown by curve 712, the UE location used to calculate the UE-specific TA used in the TA applied at time τ2 may be determined as follows:

$$x(\tau 2) = x(t1) + \frac{(x(t2) - x(t1)) * (\tau 2 - \tau 1)}{t2 - t1}$$

As shown in FIG. 7B, example 700B illustrates a scenario where the UE performs multiple GNSS position fixes between consecutive uplink transmissions and moves in a straight line between consecutive GNSS positions fixes. For example, as shown, the UE may perform updated GNSS position fixes at times t1 and t2 between the consecutive uplink transmissions that are performed at times τ1 and τ2. Accordingly, in example 700B, the TA command that the UE receives at time T corrects for the UE location error at time τ1, x(τ1)–x(t1), and the UE may discount the UE location update used to calculate the UE-specific TA for the second uplink transmission performed at time τ2 such that the UE-specific TA for the second uplink transmission only considers the remaining error x(t2)–x(τ1). For example, in cases where the UE does not predict the UE location at time τ2 (e.g., relying only on the GNSS position fixes at times t2 and t3), the UE location used to calculate the UE-specific TA used in the TA applied at time τ2 may be determined as follows:

$$x(\tau 2) = x(t3) + \frac{(x(t2) - x(t1)) * (\tau 1 - t1)}{t2 - t1}$$

Alternatively, when the UE predicts the UE location at time τ2, as shown by curve 714, the UE location used to calculate the UE-specific TA used in the TA applied at time τ2 may be determined as follows:

$$x(\tau 2) = x(t3) + \frac{(x(t2) - x(t1)) * (\tau 1 - t1)}{t2 - t1} + \frac{(x(t3) - x(t2)) * (\tau 2 - t3)}{t3 - t2}$$

As shown in FIG. 7C, example 700C illustrates a scenario where the UE performs multiple GNSS position fixes between consecutive uplink transmissions and moves in a straight line throughout (e.g., over a course of all of the GNSS positions fixes). For example, in a similar manner as described above with reference to FIG. 7B, the UE may perform updated GNSS position fixes at times t1 and t2 between the consecutive uplink transmissions that are performed at times τ1 and τ2. Accordingly, in example 700C, the TA command that the UE receives at time T corrects for the UE location error at time τ1, x(τ1)–x(t1), and the UE may discount the UE location update used to calculate the UE-specific TA for the second uplink transmission performed at time τ2 such that the UE-specific TA for the second uplink transmission only considers the remaining error x(t2)–x(τ1). For example, in cases where the UE does not predict the UE location at time τ2 (e.g., relying only on the GNSS position fixes at times t2 and t3), the UE location used to calculate the UE-specific TA used in the TA applied at time τ2 may be determined as follows:

$$x(\tau 2) = x(t1) + \frac{(x(t3) - x(t1)) * (t3 - t1)}{t3 - t1}$$

Alternatively, when the UE predicts the UE location at time τ2, as shown by curve 716, the UE location used to calculate the UE-specific TA used in the TA applied at time τ2 may be determined as follows:

$$x(\tau 2) = x(t1) + \frac{(x(t3) - x(t1)) * (\tau 2 - \tau 1)}{t3 - t1}$$

As indicated above, FIGS. 7A-7C are provided as examples. Other examples may differ from what is described with regard to FIGS. 7A-7C.

Figure 8:
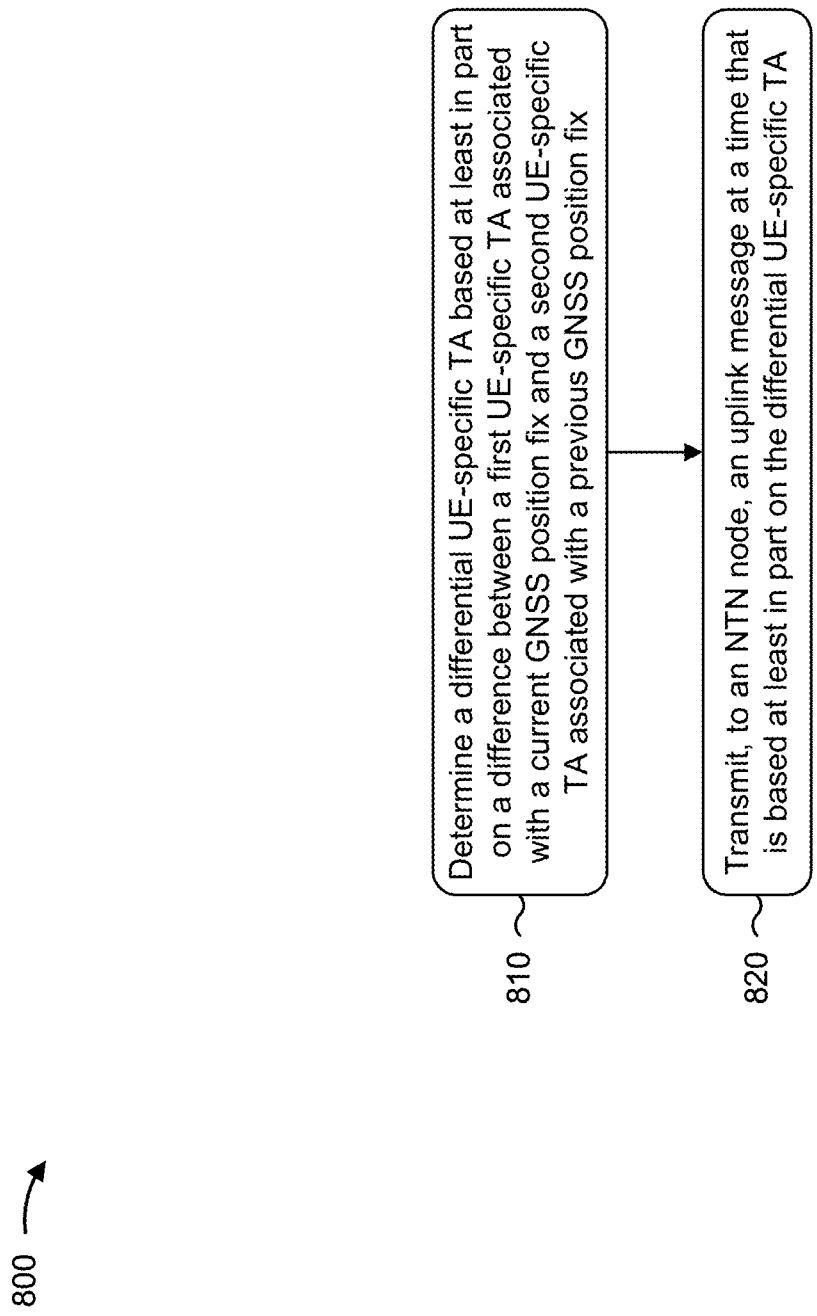
FIG. 8 is a diagram illustrating an example process associated with TA slew rate control in an NTN, in accordance with the present disclosure.

FIG. 8 is a diagram illustrating an example process 800 performed, for example, by a UE, in accordance with the present disclosure. Example process 800 is an example where the UE (e.g., UE 120) performs operations associated with TA slew rate control in an NTN.

As shown in FIG. 8, in some aspects, process 800 may include determining a differential UE-specific TA based at least in part on a difference between a first UE-specific TA associated with a current GNSS position fix and a second UE-specific TA associated with a previous GNSS position fix (block 810). For example, the UE (e.g., using communication manager 140 and/or TA component 908, depicted in FIG. 9) may determine a differential UE-specific TA based at least in part on a difference between a first UE-specific TA associated with a current GNSS position fix and a second UE-specific TA associated with a previous GNSS position fix, as described above.

As further shown in FIG. 8, in some aspects, process 800 may include transmitting, to an NTN node, an uplink message at a time that is based at least in part on the differential UE-specific TA (block 820). For example, the UE (e.g., using communication manager 140 and/or transmission component 904, depicted in FIG. 9) may transmit, to an NTN node, an uplink message at a time that is based at least in part on the differential UE-specific TA, as described above.

Process 800 may include additional aspects, such as any single aspect or any combination of aspects described below and/or in connection with one or more other processes described elsewhere herein.

In a first aspect, a satellite position used to calculate the first UE-specific TA is the same as a satellite position used to calculate the second UE-specific TA.

In a second aspect, alone or in combination with the first aspect, determining the differential UE-specific TA includes determining that the difference between the first UE-specific TA and the second UE-specific TA is not within a range, adjusting the second UE-specific TA according to a delta to calculate a value for the differential UE-specific TA that is within the range, and using the adjusted second UE-specific TA to compute the time at which the uplink message is transmitted.

In a third aspect, alone or in combination with one or more of the first and second aspects, the delta has a value that is based at least in part on a delay between a time of the current GNSS position fix and the time at which the uplink message is transmitted.

In a fourth aspect, alone or in combination with one or more of the first through third aspects, a change to the delta in one adjustment satisfies a threshold related to a maximum magnitude for a timing change in one adjustment.

In a fifth aspect, alone or in combination with one or more of the first through fourth aspects, one or more changes to the delta within a time period satisfy a threshold related to a minimum aggregate adjustment rate within the time period.

In a sixth aspect, alone or in combination with one or more of the first through fifth aspects, one or more changes to the delta within a time period satisfy a threshold related to a maximum aggregate adjustment rate within the time period.

In a seventh aspect, alone or in combination with one or more of the first through sixth aspects, determining the differential UE-specific TA includes determining that the difference between the first UE-specific TA and the second UE-specific TA exceeds a maximum slew rate, and adjusting a UE location used to calculate the first UE-specific TA such that the differential UE-specific TA changes the second UE-specific TA by a delta.

In an eighth aspect, alone or in combination with one or more of the first through seventh aspects, the delta satisfies one or more of a first threshold related to a maximum magnitude for a timing change in one adjustment, a second threshold related to a minimum aggregate adjustment rate, or a third threshold related to a maximum aggregate adjustment rate.

In a ninth aspect, alone or in combination with one or more of the first through eighth aspects, the UE location used to calculate the first UE-specific TA is adjusted such that a distance between the UE location used to calculate the first UE-specific TA and a previous UE location associated with the previous GNSS position fix satisfies one or more thresholds.

In a tenth aspect, alone or in combination with one or more of the first through ninth aspects, the one or more thresholds include a threshold related to a maximum magnitude for a distance change in one adjustment, a threshold related to a minimum aggregate adjustment rate, or a threshold related to a maximum aggregate adjustment rate.

In an eleventh aspect, alone or in combination with one or more of the first through tenth aspects, the UE location used to calculate the first UE-specific TA is adjusted based at least in part on a time difference between the time at which the uplink message is transmitted and a time at which a previous uplink message associated with the second UE-specific TA was transmitted.

In a twelfth aspect, alone or in combination with one or more of the first through eleventh aspects, the UE location used to calculate the first UE-specific TA is adjusted based at least in part on a time difference between the current GNSS position fix and the previous GNSS position fix.

In a thirteenth aspect, alone or in combination with one or more of the first through twelfth aspects, process 800 includes receiving, from the NTN node, a TA command after transmitting an uplink message using the second UE-specific TA, and estimating a UE location error that is corrected in the TA command, wherein the UE location used to calculate the first UE-specific TA is adjusted according to the estimated UE location error that is corrected in the TA command.

In a fourteenth aspect, alone or in combination with one or more of the first through thirteenth aspects, the UE location used to calculate the first UE-specific TA is adjusted according to the estimated UE location error based at least in part on the uplink message using the second UE-specific TA occurring at an arrival time of the TA command minus a delay.

In a fifteenth aspect, alone or in combination with one or more of the first through fourteenth aspects, the delay is an RTT between the UE and the NTN node, the RTT between the UE and the NTN node plus a duration, or zero.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
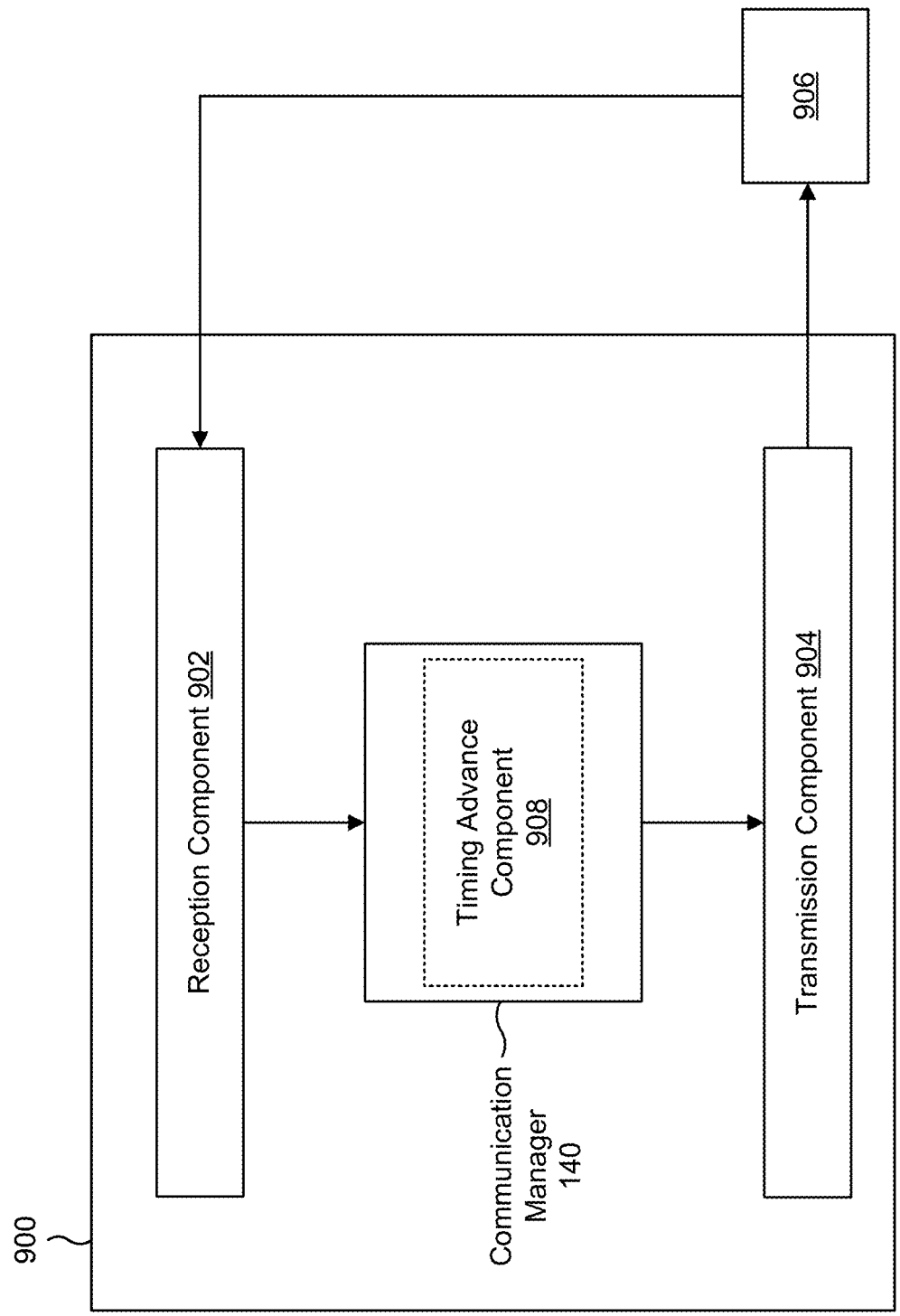
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a TA component 908, among other examples.

In some aspects, the apparatus 900 may be configured to perform one or more operations described herein in connection with FIG. 4, FIG. 5, FIG. 6, and/or FIGS. 7A-7C. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The TA component 908 may determine a differential UE-specific TA based at least in part on a difference between a first UE-specific TA associated with a current GNSS position fix and a second UE-specific TA associated with a previous GNSS position fix. The transmission component 904 may transmit, to an NTN node, an uplink message at a time that is based at least in part on the differential UE-specific TA.

The TA component 908 may determine that the difference between the first UE-specific TA and the second UE-specific TA is not within a range. The TA component 908 may adjust the second UE-specific TA according to a delta to calculate a value for the differential UE-specific TA that is within the range. The TA component 908 may use the adjusted second UE-specific TA to compute the time at which the uplink message is transmitted.

The TA component 908 may determine that the difference between the first UE-specific TA and the second UE-specific TA exceeds a maximum slew rate. The TA component 908 may adjust a UE location used to calculate the first UE-specific TA such that the differential UE-specific TA changes the second UE-specific TA by a delta.

The reception component 902 may receive, from the NTN node, a TA command after transmitting an uplink message using the second UE-specific TA. The TA component 908 may estimate a UE location error that is corrected in the TA command, and may adjust the UE location used to calculate the first UE-specific TA according to the estimated UE location error that is corrected in the TA command.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: determining a differential UE-specific TA based at least in part on a difference between a first UE-specific TA associated with a current GNSS position fix and a second UE-specific TA associated with a previous GNSS position fix; and transmitting, to an NTN node, an uplink message at a time that is based at least in part on the differential UE-specific TA.

Aspect 2: The method of Aspect 1, wherein a satellite position used to calculate the first UE-specific TA is the same as a satellite position used to calculate the second UE-specific TA.

Aspect 3: The method of any of Aspects 1-2, wherein determining the differential UE-specific TA includes: determining that the difference between the first UE-specific TA and the second UE-specific TA is not within a range; adjusting the second UE-specific TA according to a delta to calculate a value for the differential UE-specific TA that is within the range; and using the adjusted second UE-specific TA to compute the time at which the uplink message is transmitted.

Aspect 4: The method of Aspect 3, wherein the delta has a value that is based at least in part on a delay between a time of the current GNSS position fix and the time at which the uplink message is transmitted.

Aspect 5: The method of any of Aspects 3-4, wherein a change to the delta in one adjustment has a value that satisfies a threshold related to a maximum magnitude for a timing change in one adjustment.

Aspect 6: The method of any of Aspects 3-5, wherein one or more changes to the delta within a time period satisfy a threshold related to a minimum aggregate adjustment rate within the time period.

Aspect 7: The method of any of Aspects 3-6, wherein one or more changes to the delta within a time period satisfy a threshold related to a maximum aggregate adjustment rate within the time period.

Aspect 8: The method of any of Aspects 1-2, wherein determining the differential UE-specific TA includes: determining that the difference between the first UE-specific TA and the second UE-specific TA exceeds a maximum slew rate; and adjusting a UE location used to calculate the first UE-specific TA such that the differential UE-specific TA changes the second UE-specific TA by a delta.

Aspect 9: The method of Aspect 8, wherein the delta satisfies one or more of a first threshold related to a maximum magnitude for a timing change in one adjustment, a second threshold related to a minimum aggregate adjustment rate, or a third threshold related to a maximum aggregate adjustment rate.

Aspect 10: The method of any of Aspects 8-9, wherein the UE location used to calculate the first UE-specific TA is adjusted such that a distance between the UE location used to calculate the first UE-specific TA and a previous UE location associated with the previous GNSS position fix satisfies one or more thresholds.

Aspect 11: The method of Aspect 10, wherein the one or more thresholds include a threshold related to a maximum magnitude for a distance change in one adjustment, a threshold related to a minimum aggregate adjustment rate, or a threshold related to a maximum aggregate adjustment rate.

Aspect 12: The method of any of Aspects 8-11, wherein the UE location used to calculate the first UE-specific TA is adjusted based at least in part on a time difference between the time at which the uplink message is transmitted and a time at which a previous uplink message associated with the second UE-specific TA was transmitted.

Aspect 13: The method of any of Aspects 8-11, wherein the UE location used to calculate the first UE-specific TA is adjusted based at least in part on a time difference between the current GNSS position fix and the previous GNSS position fix.

Aspect 14: The method of any of Aspects 8-13, further comprising: receiving, from the NTN node, a TA command after transmitting an uplink message using the second UE-specific TA; and estimating a UE location error that is corrected in the TA command, wherein the UE location used to calculate the first UE-specific TA is adjusted according to the estimated UE location error that is corrected in the TA command.

Aspect 15: The method of Aspect 14, wherein the UE location used to calculate the first UE-specific TA is adjusted according to the estimated UE location error based at least in part on the uplink message using the second UE-specific TA occurring at an arrival time of the TA command minus a delay.

Aspect 16: The method of Aspect 15, wherein the delay is an RTT between the UE and the NTN node, the RTT between the UE and the NTN node plus a duration, or zero.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        determine a differential UE-specific timing advance (TA) based at least in part on a difference between a first UE-specific TA associated with a current global navigation satellite system (GNSS) position fix and a second UE-specific TA associated with a previous GNSS position fix; and
        transmit, to a non-terrestrial network (NTN) node, an uplink message at a time that is based at least in part on the differential UE-specific TA.

2. The UE of claim 1, wherein a satellite position used to calculate the first UE-specific TA is the same as a satellite position used to calculate the second UE-specific TA.

3. The UE of claim 1, wherein the one or more processors, to determine the differential UE-specific TA, are configured to:
    determine that the difference between the first UE-specific TA and the second UE-specific TA is not within a range;
    adjust the second UE-specific TA according to a delta to calculate a value for the differential UE-specific TA that is within the range; and
    use the adjusted second UE-specific TA to compute the time at which the uplink message is transmitted.

4. The UE of claim 3, wherein the delta has a value that is based at least in part on a delay between a time of the current GNSS position fix and the time at which the uplink message is transmitted.

5. The UE of claim 3, wherein a change to the delta in one adjustment satisfies a threshold related to a maximum magnitude for a timing change in one adjustment.

6. The UE of claim 3, wherein one or more changes to the delta within a time period satisfy a threshold related to a minimum aggregate adjustment rate within the time period.

7. The UE of claim 3, wherein one or more changes to the delta within a time period satisfy a threshold related to a maximum aggregate adjustment rate within the time period.

8. The UE of claim 1, wherein the one or more processors, to determine the differential UE-specific TA, are configured to:
    determine that the difference between the first UE-specific TA and the second UE-specific TA exceeds a maximum slew rate; and
    adjust a UE location used to calculate the first UE-specific TA such that the differential UE-specific TA changes the second UE-specific TA by a delta.

9. The UE of claim 8, wherein the delta satisfies one or more of a first threshold related to a maximum magnitude for a timing change in one adjustment, a second threshold related to a minimum aggregate adjustment rate, or a third threshold related to a maximum aggregate adjustment rate.

10. The UE of claim 8, wherein the UE location used to calculate the first UE-specific TA is adjusted such that a distance between the UE location used to calculate the first UE-specific TA and a previous UE location associated with the previous GNSS position fix satisfies one or more thresholds.

11. The UE of claim 10, wherein the one or more thresholds include a threshold related to a maximum magnitude for a distance change in one adjustment, a threshold related to a minimum aggregate adjustment rate, or a threshold related to a maximum aggregate adjustment rate.

12. The UE of claim 8, wherein the UE location used to calculate the first UE-specific TA is adjusted based at least in part on a time difference between the time at which the uplink message is transmitted and a time at which a previous uplink message associated with the second UE-specific TA was transmitted.

13. The UE of claim 8, wherein the UE location used to calculate the first UE-specific TA is adjusted based at least in part on a time difference between the current GNSS position fix and the previous GNSS position fix.

14. The UE of claim 8, wherein the one or more processors are further configured to:
    receive, from the NTN node, a TA command after transmitting an uplink message using the second UE-specific TA; and
    estimate a UE location error that is corrected in the TA command, wherein the UE location used to calculate the first UE-specific TA is adjusted according to the estimated UE location error that is corrected in the TA command.

15. The UE of claim 14, wherein the UE location used to calculate the first UE-specific TA is adjusted according to the estimated UE location error based at least in part on the uplink message using the second UE-specific TA occurring at an arrival time of the TA command minus a delay.

16. The UE of claim 15, wherein the delay is a round-trip time (RTT) between the UE and the NTN node, the RTT between the UE and the NTN node plus a duration, or zero.

17. A method of wireless communication performed by a user equipment (UE), comprising:
    determining a differential UE-specific timing advance (TA) based at least in part on a difference between a first UE-specific TA associated with a current global navigation satellite system (GNSS) position fix and a second UE-specific TA associated with a previous GNSS position fix; and
    transmitting, to a non-terrestrial network (NTN) node, an uplink message at a time that is based at least in part on the differential UE-specific TA.

18. The method of claim 17, wherein a satellite position used to calculate the first UE-specific TA is the same as a satellite position used to calculate the second UE-specific TA.

19. The method of claim 17, wherein determining the differential UE-specific TA comprises:
   determining that the difference between the first UE-specific TA and the second UE-specific TA is not within a range;
   adjusting the second UE-specific TA according to a delta to calculate a value for the differential UE-specific TA that is within the range; and
   using the adjusted second UE-specific TA to compute the time at which the uplink message is transmitted.

20. The method of claim 19, wherein the delta has a value that is based at least in part on a delay between a time of the current GNSS position fix and the time at which the uplink message is transmitted.

21. The method of claim 19, wherein a change to the delta in one adjustment satisfies a threshold related to a maximum magnitude for a timing change in one adjustment.

22. The method of claim 19, wherein one or more changes to the delta within a time period satisfy a threshold related to a minimum aggregate adjustment rate within the time period.

23. The method of claim 19, wherein one or more changes to the delta within a time period satisfy a threshold related to a maximum aggregate adjustment rate within the time period.

24. The method of claim 17, wherein determining the differential UE-specific TA comprises:
   determining that the difference between the first UE-specific TA and the second UE-specific TA exceeds a maximum slew rate; and
   adjusting a UE location used to calculate the first UE-specific TA such that the differential UE-specific TA changes the second UE-specific TA by a delta.

25. The method of claim 24, wherein the delta satisfies one or more of a first threshold related to a maximum magnitude for a timing change in one adjustment, a second threshold related to a minimum aggregate adjustment rate, or a third threshold related to a maximum aggregate adjustment rate.

26. The method of claim 24, wherein the UE location used to calculate the first UE-specific TA is adjusted such that a distance between the UE location used to calculate the first UE-specific TA and a previous UE location associated with the previous GNSS position fix satisfies one or more thresholds.

27. The method of claim 24, wherein the UE location used to calculate the first UE-specific TA is adjusted based at least in part on a time difference between the time at which the uplink message is transmitted and a time at which a previous uplink message associated with the second UE-specific TA was transmitted or a time difference between the current GNSS position fix and the previous GNSS position fix.

28. The method of claim 24, further comprising:
   receiving, from the NTN node, a TA command after transmitting an uplink message using the second UE-specific TA; and
   estimating a UE location error that is corrected in the TA command, wherein the UE location used to calculate the first UE-specific TA is adjusted according to the estimated UE location error that is corrected in the TA command.

29. A non-transitory computer-readable medium storing a set of instructions for wireless communication, the set of instructions comprising:
   one or more instructions that, when executed by one or more processors of a user equipment (UE), cause the UE to:
      determine a differential UE-specific timing advance (TA) based at least in part on a difference between a first UE-specific TA associated with a current global navigation satellite system (GNSS) position fix and a second UE-specific TA associated with a previous GNSS position fix; and
      transmit, to a non-terrestrial network (NTN) node, an uplink message at a time that is based at least in part on the differential UE-specific TA.

30. An apparatus for wireless communication, comprising:
   means for determining a differential UE-specific timing advance (TA) based at least in part on a difference between a first UE-specific TA associated with a current global navigation satellite system (GNSS) position fix and a second UE-specific TA associated with a previous GNSS position fix; and
   means for transmitting, to a non-terrestrial network (NTN) node, an uplink message at a time that is based at least in part on the differential UE-specific TA.

* * * * *